United States Patent
Camargo et al.

(10) Patent No.: US 11,835,095 B1
(45) Date of Patent: Dec. 5, 2023

(54) CONCENTRIC SLAVE CYLINDER CONNECTOR

(71) Applicant: Schaeffler Technologies AG & Co. KG, Herzogenaurach (DE)

(72) Inventors: Felipe Gimenes Camargo, Sorocaba (BR); Bruno Corsi Alabarse, Sorocaba (BR)

(73) Assignee: Schaeffler Techologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/102,335

(22) Filed: Jan. 27, 2023

(51) Int. Cl.
  *F16D 25/08* (2006.01)

(52) U.S. Cl.
  CPC ........ *F16D 25/08* (2013.01); *F16D 2025/081* (2013.01)

(58) Field of Classification Search
  CPC .............. F16D 2025/081; F16D 25/08; F16D 2048/0212; F16D 2121/04; F16D 2125/04
  See application file for complete search history.

(56) References Cited

U.S. PATENT DOCUMENTS

| | | | | |
|---|---|---|---|---|
| 4,991,627 A * | 2/1991 | Nix | .......................... | F16D 48/02 285/319 |
| 5,113,657 A * | 5/1992 | Compton | .............. | F16L 37/091 192/85.01 |
| 8,051,658 B2 * | 11/2011 | Rammhofer | .......... | F16D 25/082 60/591 |

* cited by examiner

*Primary Examiner* — Huan Le
(74) *Attorney, Agent, or Firm* — Volpe Koenig

(57) ABSTRACT

A fluid connector for coupling an associated slave cylinder to a mating connector of an associated high-pressure pipe. The fluid connector includes a unitary one-piece connector body having a male end and a female end, the male end adapted to be received in a port of the associated slave cylinder, the female end adapted to receive a male end of the mating connector of the associated high-pressure pipe.

14 Claims, 3 Drawing Sheets

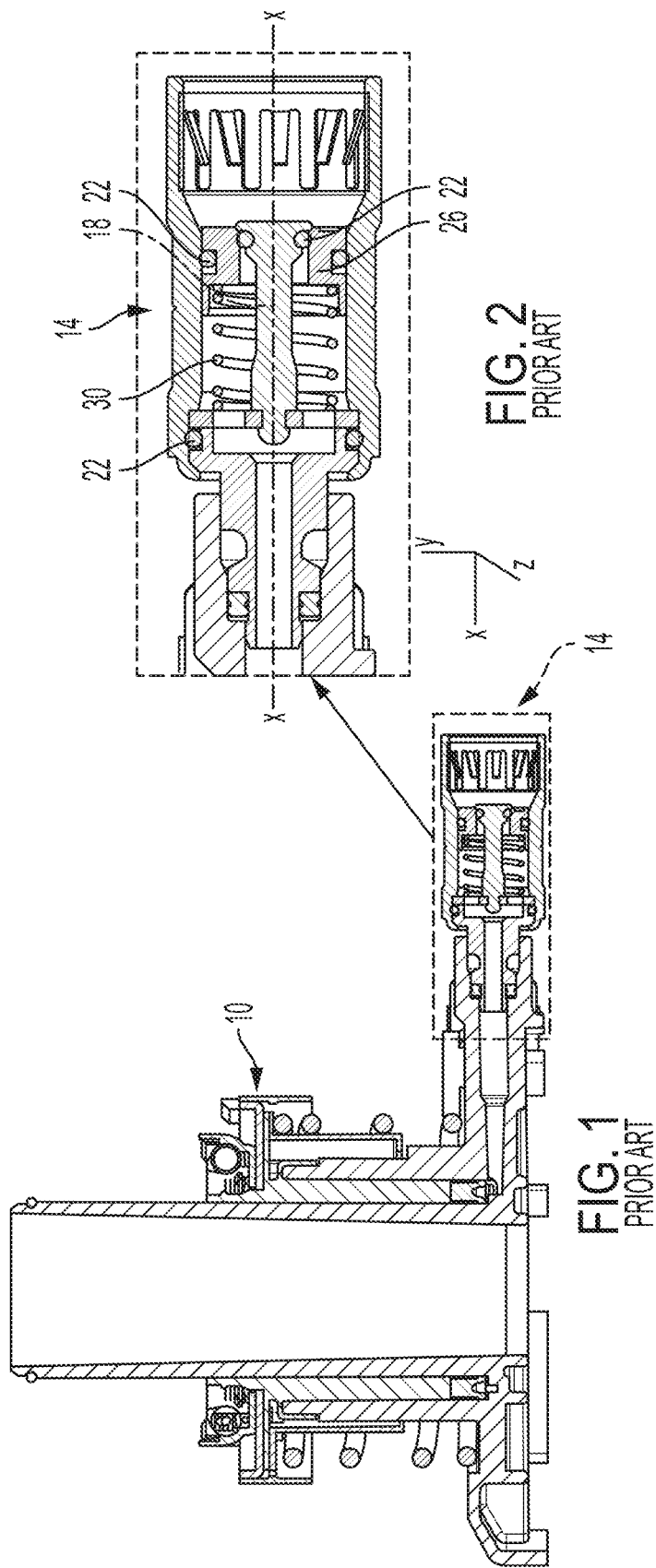

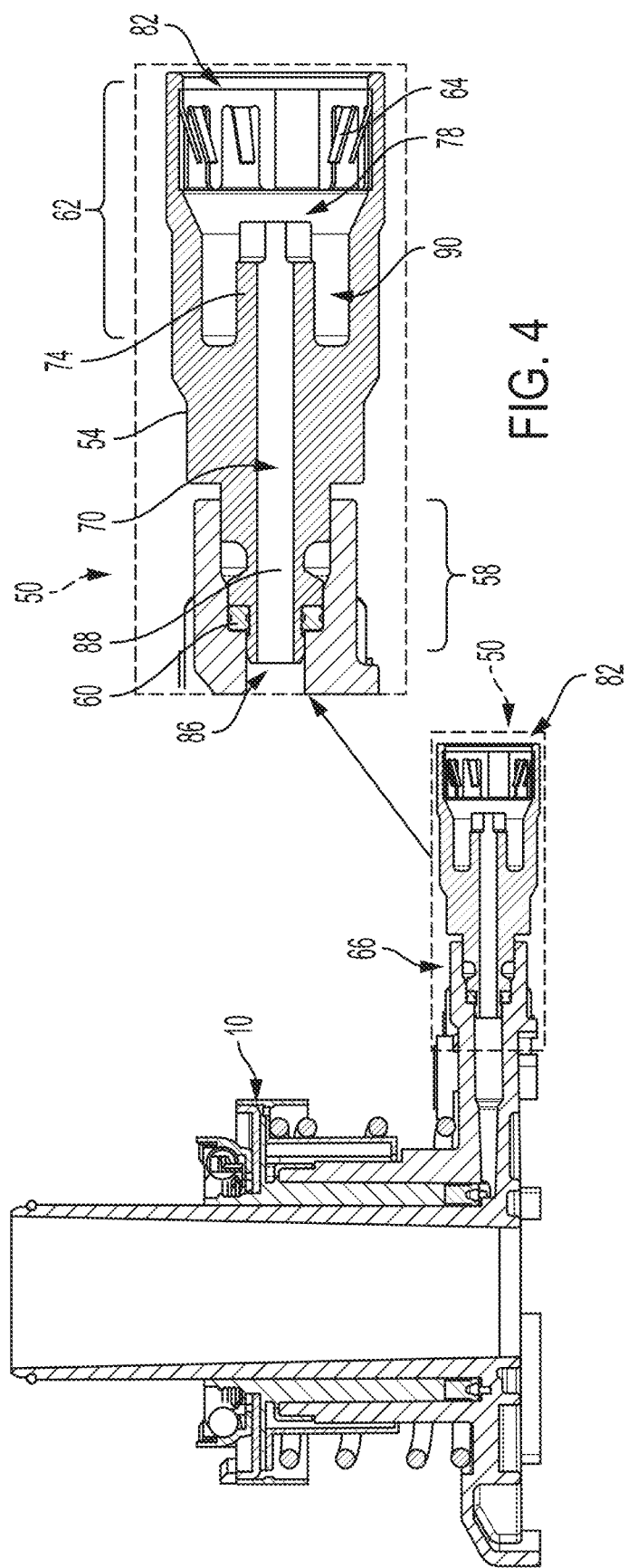

CONCENTRIC SLAVE CYLINDER CONNECTOR

FIELD OF INVENTION

The present disclosure relates to a fluid-actuated clutch assembly, and is more particularly related to a connector for fluidically coupling a concentric slave cylinder to a high-pressure pipe.

BACKGROUND

Fluid-actuated clutch systems are well known. The basic components of such systems generally include a master cylinder fluidically coupled to one or more slave cylinders via a high-pressure pipe. The master cylinder can be actuated to supply pressurized fluid to the slave cylinder, such as with a foot pedal of a vehicle, for example, to engage or disengage an output shaft.

Within these systems, it is generally known that one or more fluid connections are made between the various components (e.g., master cylinder, slave cylinder, a high-pressure pipe, etc.) during installation or repair. In many instances, particularly when a vehicle is being built, it is desirable to install one or more of the components in a prefilled stated state to eliminate or reduce the need to bleed the system after installation. Specialized connectors have been developed for this purpose. For example, prefilled slave cylinders are typically provided with a connector having valving capable of retaining fluid within the slave cylinder prior to installation, and operative to fluidically couple the slave cylinder to a mating connector of a high-pressure pipe at installation.

For aftermarket purposes, normally the slave cylinder is not supplied filled with fluid. However, the connector described above having valving capable of retaining fluid within the slave cylinder prior to installation, and operative to fluidically couple the slave cylinder to a mating connector of a high-pressure pipe at installation, is supplied due to its interface with the mating high pressure pipe. The special connector has a complex design with high costs for production and assembly. Further, the complex design can be a point of failure within the system.

It would be desirable to provide an improved connection arrangement between the components in a fluid-actuated clutch system that is more cost-effective for components that are supplied unfilled.

SUMMARY

In accordance with an aspect of the present disclosure, a slave cylinder assembly comprises a slave cylinder and a fluid connector for coupling the slave cylinder to a mating connector of an associated high-pressure pipe. The fluid connector includes a unitary one-piece connector body having a male end and a female end, the male end received in a port of the slave cylinder, the female end adapted to receive a male end of the mating connector of the associated high-pressure pipe, the connector body having a passageway extending between the male end and the female end, and a stem recessed in the female end, the stem having an axial end face configured to open a valve of the mating connector of the associated high-pressure pipe when connected thereto.

The passageway can be defined at least in part by an axially extending center bore in the connector body, wherein the center bore has a constant diameter along a length thereof and extends along a majority of a length of the connector body between the male end and the female end, whereby the passageway has a constant diameter along a majority of a length thereof. The connector body can include an annular bore surrounding at least a portion of the stem. The passageway can extend at least partially through the stem. The passageway can allow free flow of fluid between the male end and the female end of the connector body. The axial end face of the stem is coaxial with the center bore. The connector can include a retaining spring supported in the female end.

In accordance with another aspect of the present disclosure, a fluid connector for coupling an associated slave cylinder to a mating connector of an associated high-pressure pipe comprises a unitary one-piece connector body having a male end and a female end, the male end adapted to be received in a port of the associated slave cylinder, the female end adapted to receive a male end of the mating connector of the associated high-pressure pipe, the connector body having a passageway extending between the male end and the female end, and a stem recessed in the female end, the stem having an axial end face configured to open a valve of the mating connector of the associated high-pressure pipe when connected thereto.

The passageway can be defined at least in part by an axially extending center bore in the connector body, wherein the center bore has a constant diameter along a length thereof and extends along a majority of a length of the connector body between the male end and the female end, whereby the passageway has a constant diameter along a majority of a length thereof. The connector body can include an annular bore surrounding at least a portion of the stem. The passageway can extend at least partially through the stem. The passageway can allow free flow of fluid between the male end and the female end. The axial end face of the stem can be coaxial with the center bore. The connector can include a retaining spring supported in the female end.

Additional embodiments are disclosed herein.

BRIEF DESCRIPTION OF THE DRAWINGS

The foregoing Summary and the following Detailed Description will be better understood when read in conjunction with the appended drawings, which illustrate an embodiment of the disclosure. In the drawings:

FIG. 1 is a cross-sectional view of a prior art prefilled concentric slave cylinder and special connector valve;

FIG. 2 is an enlarged portion of FIG. 1;

FIG. 3 a cross-sectional view of a concentric slave cylinder and an exemplary connector in accordance with the present disclosure;

FIG. 4 is an enlarged portion of FIG. 3; and

DETAILED DESCRIPTION

Figure 5:
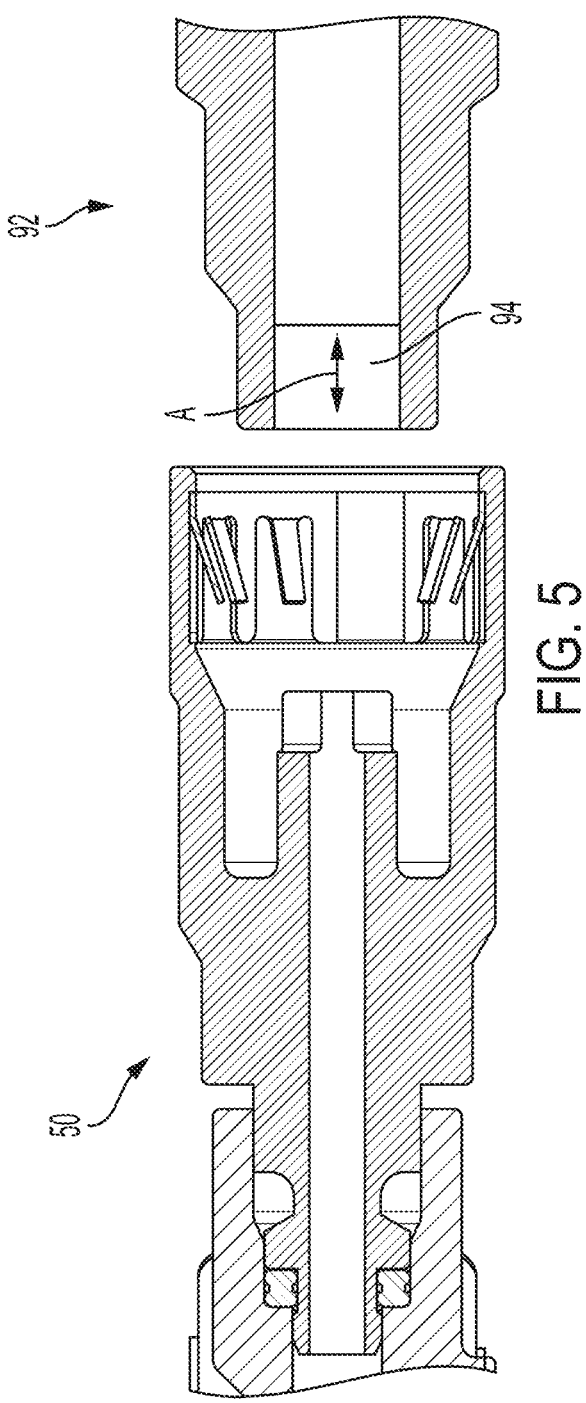
FIG. 5 is a cross-sectional view of the exemplary connector in accordance with the present disclosure and a cooperating connector of a high-pressure pipe.

Certain terminology is used in the following description for convenience only and is not limiting. "Axially" refers to a direction along an axis (X) of a connector, as shown in FIG. 2, for example. "Radially" refers to a direction inward and outward from the axis (X) of the connector, i.e. in the "Y" direction as shown in FIG. 2, for example.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

The terms "generally" and "about" mean+/−10% of a specified value or +/−10 degrees of a specified angle, axis or direction.

FIGS. 1 and 2 illustrate a slave cylinder 10 and a special connector 14 according to the prior art with valving capable of retaining fluid within the slave cylinder 10 prior to installation. The special connector 14 includes a valve stem 18, various sealing elements 22, a movable valve disk 26, and a spring 30 biasing the movable valve disk 26 towards a closed position. The movable valve disk 26 can be displaced to the left in FIG. 2 to an open position to permit pre-filling of the slave cylinder 10, and is configured to be displaced to the left to an open position and maintained in the open position by corresponding structure of a cooperating connector of a high-pressure pipe when connected thereto.

Turning to FIGS. 3 and 4, a slave cylinder 10 and a connector 50 in accordance with the present disclosure are illustrated. The connector 50 includes a unitary one-piece connector body 54 having a male end 58 supporting a sealing element 60 and a female end 62 in which a retaining spring 64 is received. The male end 58 is received in a port 66 of the slave cylinder 10. In the illustrated embodiment, the connector 50 is press fit into the port 66, although other connection styles are possible, such as a snap-fit of a projection (either movable or fixed) into a recess. The female end 62 is adapted to receive a male end of the mating connector of the associated high-pressure pipe and the retaining spring 64 is configured to engage and retain the male end of the mating connector, as will be described below in connection with FIG. 5.

The connector body 54 has a passageway 70 extending between the male end 58 and the female end 62, and a stem 74 in the female end 62. An axial end face 78 of the stem 74 is recessed from an opening 82 of the female end 62 and is configured to open a valve of the mating connector of the associated high-pressure pipe when connected thereto.

The passageway 70 extends through the connector body 54 and permits free flow of fluid between the opening 82 of the female end 62 and an opening 86 of the male end 58. The passageway 70 is defined at least in part by an axially extending center bore 88 in the connector body 54, wherein the center bore 88 in the illustrated embodiment has a constant diameter along its length and extends along a majority of a length of the connector body 54 between the male end 58 and the female end 62. Accordingly, the passageway 70 has a constant diameter along a majority of a length thereof in the illustrated embodiment, which can reduce flow resistance.

An annular bore 90 is spaced radially outwardly from a portion of the center bore 88 such that the annular bore 90 and the center bore 88 are coextensive along at least a portion of the length of the connector body 54. A radially outer surface of the stem 74 defines a portion of a boundary of the annular bore 90 and a radially inner surface of the stem 74 defines a portion of a boundary of the center bore 88.

Turning to FIG. 5, the connector 50 is adapted to cooperate with a male connector of a high-pressure pipe to fluidically connect the slave cylinder to other components of a clutch system (e.g., a master cylinder). The male connector is illustrated schematically and identified generally by reference numeral 92. The male connector 92 includes a valve element operative to seal the connector 92 prior to connection with the connector 50. The valve element is also illustrated schematically in FIG. 5 and identified by reference numeral 94. In the illustrated example, the valve element 94 is longitudinally displaceable between open and closed positions, as indicated by arrow A. It should be appreciated that displacement of the valve element 94 to the right from the position shown in FIG. 5 opens the male connector 92 permitting fluid to flow therethrough. Accordingly, when the male connector 92 is received in the female end 62 of the connector 50, the axial end face 78 of the stem 74 is configured to engage and displace the valve element 94 to an open position.

While the foregoing description describes the connector 50 in conjunction with a concentric slave cylinder of a clutch system, it should be appreciated that the connector 50 can be used for coupling other components in a wide variety of hydraulic and/or pneumatic systems.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS slave cylinder 10
special connector 14
valve stem 18
sealing elements 22
movable valve disk 26
spring 30
connector 50
connector body 54
male end 58
sealing element 60
female end 62
retaining spring 64
port 66
passageway 70
stem 74
axial end face 78
opening 82 (female end)
opening 86 (male end)
center bore 88;
annular bore 90
male connector 92
valve element 94

What is claimed is:

1. A slave cylinder assembly, comprising:
a slave cylinder; and
a fluid connector for coupling the slave cylinder to a mating connector of an associated high-pressure pipe;
wherein the fluid connector includes a unitary one-piece connector body having a male end and a female end, the male end received in a port of the slave cylinder, the female end adapted to receive a male end of the mating connector of the associated high-pressure pipe, the connector body having a passageway extending between the male end and the female end, and a stem recessed in the female end, the stem having an axial end face configured to open a valve of the mating connector of the associated high-pressure pipe when connected thereto.

2. The slave cylinder assembly according to claim 1, wherein the passageway is defined at least in part by an axially extending center bore in the connector body, wherein the center bore has a constant diameter along a length thereof and extends along a majority of a length of the connector body between the male end and the female end, whereby the passageway has a constant diameter along a majority of a length thereof.

3. The slave cylinder assembly according to claim 2, wherein the connector body includes an annular bore surrounding at least a portion of the stem.

4. The slave cylinder assembly according to claim 3, wherein the passageway extends at least partially through the stem.

5. The slave cylinder assembly according to claim 4, wherein the passageway allows free flow of fluid between the male end and the female end of the connector body.

6. The slave cylinder assembly according to claim 1, wherein the axial end face of the stem is coaxial with the center bore.

7. The slave cylinder assembly according to claim 1, further comprising a retaining spring supported in the female end.

8. A fluid connector for coupling an associated slave cylinder to a mating connector of an associated high-pressure pipe comprising:

a unitary one-piece connector body having a male end and a female end, the male end adapted to be received in a port of the associated slave cylinder, the female end adapted to receive a male end of the mating connector of the associated high-pressure pipe, the connector body having a passageway extending between the male end and the female end, and a stem recessed in the female end, the stem having an axial end face configured to open a valve of the mating connector of the associated high-pressure pipe when connected thereto.

9. The fluid connector according to claim 8, wherein the passageway is defined at least in part by an axially extending center bore in the connector body, wherein the center bore has a constant diameter along a length thereof and extends along a majority of a length of the connector body between the male end and the female end, whereby the passageway has a constant diameter along a majority of a length thereof.

10. The fluid connector according to claim 9, wherein the connector body includes an annular bore surrounding at least a portion of the stem.

11. The fluid connector according to claim 10, wherein the passageway extends at least partially through the stem.

12. The fluid connector according to claim 11, wherein the passageway allows free flow of fluid between the male end and the female end.

13. The fluid connector according to claim 8, wherein the axial end face of the stem is coaxial with the center bore.

14. The fluid connector according to claim 8, further comprising a retaining spring supported in the female end.

\* \* \* \* \*